United States Patent
Han et al.

(10) Patent No.: US 11,531,889 B2
(45) Date of Patent: Dec. 20, 2022

(54) WEIGHT DATA STORAGE METHOD AND NEURAL NETWORK PROCESSOR BASED ON THE METHOD

(71) Applicant: INSTITUTE OF COMPUTING TECHNOLOGY, CHINESE ACADEMY OF SCIENCES, Beijing (CN)

(72) Inventors: Yinhe Han, Beijing (CN); Feng Min, Beijing (CN); Haobo Xu, Beijing (CN); Ying Wang, Beijing (CN)

(73) Assignee: INSTITUTE OF COMPUTING TECHNOLOGY, CHINESE ACADEMY OF SCIENCES, Beijing (CN)

( * ) Notice: Subject to any disclaimer, the term of this patent is extended or adjusted under 35 U.S.C. 154(b) by 326 days.

(21) Appl. No.: 16/762,810

(22) PCT Filed: Feb. 28, 2018

(86) PCT No.: PCT/CN2018/077516
§ 371 (c)(1),
(2) Date: May 8, 2020

(87) PCT Pub. No.: WO2019/091020
PCT Pub. Date: May 16, 2019

(65) Prior Publication Data
US 2021/0182666 A1 Jun. 17, 2021

(30) Foreign Application Priority Data
Nov. 10, 2017 (CN) .......................... 201711102821.6

(51) Int. Cl.
G06N 3/08 (2006.01)
G06F 17/16 (2006.01)
G06K 9/62 (2022.01)

(52) U.S. Cl.
CPC ............... *G06N 3/08* (2013.01); *G06F 17/16* (2013.01); *G06K 9/6261* (2013.01)

(58) Field of Classification Search
CPC ......... G06F 17/16; G06N 3/08; G06K 9/6261
See application file for complete search history.

(56) References Cited

U.S. PATENT DOCUMENTS

| | | | |
|---|---|---|---|
| 2017/0168990 A1 | 6/2017 | Kernert et al. | |
| 2017/0249547 A1 | 8/2017 | Shrikumar et al. | |
| 2018/0165575 A1* | 6/2018 | Henry | .................... G06N 3/063 |

FOREIGN PATENT DOCUMENTS

| | | | |
|---|---|---|---|
| CN | 106447034 | * 2/2017 | ............... G06N 3/06 |
| CN | 106447034 A | 2/2017 | |

(Continued)

OTHER PUBLICATIONS

International Search Report Application No. PCT/CN2018/077516, dated Aug. 10, 2018, 4 pages.
(Continued)

*Primary Examiner* — Myron Wyche
(74) *Attorney, Agent, or Firm* — Zhong Law, LLC

(57) ABSTRACT

Disclosed are a weight data storage method and a convolution computation method that may be implemented in a neural network. The weight data storage method comprises searching for effective weights in a weight convolution kernel matrix and acquiring an index of effective weights. The effective weights are non-zero weights, and the index of effective weights is used to mark the position of the effective weights in the weight convolution kernel matrix. The weight data storage method further comprises storing the effective weights and the index of effective weights. According to the weight data storage method and the convolution computation method of the present disclosure, storage space can be saved, and computation efficiency can be improved.

12 Claims, 7 Drawing Sheets

Convolution kernel: 5*5

| $W_{0,1}$ | $W_{0,2}$ | $W_{0,3}$ | $W_{0,4}$ | $W_{0,5}$ |
|---|---|---|---|---|
| $W_{1,1}$ | $W_{1,2}$ | $W_{1,3}$ | $W_{1,4}$ | $W_{1,5}$ |
| $W_{2,1}$ | $W_{2,2}$ | $W_{2,3}$ | $W_{2,4}$ | $W_{2,5}$ |
| $W_{3,1}$ | $W_{3,2}$ | $W_{3,3}$ | $W_{3,4}$ | $W_{3,5}$ |
| $W_{4,1}$ | $W_{4,2}$ | $W_{4,3}$ | $W_{4,4}$ | $W_{4,5}$ |

(56) References Cited

FOREIGN PATENT DOCUMENTS

| | | |
|---|---|---|
| CN | 106529670 A | 3/2017 |
| CN | 106650924 A | 5/2017 |
| CN | 106951962 A | 7/2017 |
| CN | 107153873 A | 9/2017 |
| CN | 107239823 A | 10/2017 |
| CN | 107239824 A | 10/2017 |
| CN | 107239825 A | 10/2017 |
| CN | 107292352 A | 10/2017 |
| CN | 107729995 A | 2/2018 |
| CN | 107844829 A | 3/2018 |
| JP | H0219069 A | 1/1990 |
| WO | 20170154946 A1 | 9/2017 |

OTHER PUBLICATIONS

Japanese Office Action for Japanese Application No. 2020-524354, dated Sep. 30, 2021 in 6 pages.

\* cited by examiner

Convolution kernel: 5*5

| $W_{0,1}$ | $W_{0,2}$ | $W_{0,3}$ | $W_{0,4}$ | $W_{0,5}$ |
|---|---|---|---|---|
| $W_{1,1}$ | $W_{1,2}$ | $W_{1,3}$ | $W_{1,4}$ | $W_{1,5}$ |
| $W_{2,1}$ | $W_{2,2}$ | $W_{2,3}$ | $W_{2,4}$ | $W_{2,5}$ |
| $W_{3,1}$ | $W_{3,2}$ | $W_{3,3}$ | $W_{3,4}$ | $W_{3,5}$ |
| $W_{4,1}$ | $W_{4,2}$ | $W_{4,3}$ | $W_{4,4}$ | $W_{4,5}$ |

WEIGHT DATA STORAGE METHOD AND NEURAL NETWORK PROCESSOR BASED ON THE METHOD

CROSS-REFERENCE TO RELATED APPLICATIONS

This application is the National Stage Entry under 35 U.S.C. § 371 of Patent Cooperation Treaty Application No. PCT/CN2018/077516, filed Feb. 28, 2018, which claims the benefit of Chinese Patent Application No. 201711102821.6 filed Nov. 10, 2017, the disclosure of which is herein incorporated by reference in its entirety.

TECHNICAL FIELD

The present disclosure relates to the technical field of computer learning, and in particular, to a weight data storage method and a neural network processor based on the method.

BACKGROUND

In recent years, deep learning technologies have developed rapidly and have been widely applied to solve high-level abstract cognitive problems, such as image recognition, speech recognition, natural language understanding, weather prediction, gene expression, content recommendation, intelligent robots and the like, and have become a research hotspot in academia and industry.

A deep neural network is one of the perception models with the highest development level in the field of artificial intelligence. It simulates a neural connection structure of a human brain by building a model, and describes data features hierarchically through multiple transformation stages, bringing breakthroughs to large-scale data processing tasks such as images, video, and audio. A deep neural network model is an operational model that comprises a large number of nodes connected by a mesh interconnected structure. The nodes are referred to as neurons. The connection strength between every two nodes represents a weighted value, i.e., a weight, between the two nodes through the connection signal, which corresponds to the memory in the human neural network.

However, in the prior art, the neural network has some problems such as slow processing speed and high power consumption. This is because the deep learning technologies rely on a large amount of computation. For example, in the training stage, weight information in the neural network needs to be obtained through repeated and/or iterative computation involving a large amount of data. In the reasoning stage, the neural network is also required to complete operational processing on input data in a very short response time (usually in milliseconds), especially when the neural network is applied to real-time systems, such as autonomous driving. Computation involved in the neural network mainly includes convolution operations, activation operations, pooling operations, etc., among which the convolution operations and the pooling operations occupy most of the processing time of the neural network.

Therefore, in order to expand the application range of the neural network, for example, in the fields of intelligent wearing, intelligent robots, autonomous driving, pattern recognition and the like, the prior art needs to be improved to achieve real-time data processing, low power consumption and improved utilization of computing resources.

SUMMARY

The present disclosure aims at providing a weight data storage method and a neural network processor based on the method, so as to overcome the defects of the prior art.

According to a first aspect of the prevent disclosure, a weight data storage method in a neural network is provided, comprising the following steps:

step 1: searching for effective weights in a weight convolution kernel matrix and acquiring an index of effective weights, wherein the effective weights are non-zero weights, and the index of effective weights is used to mark the position of the effective weights in the weight convolution kernel matrix; and step 2: storing the effective weights and the index of effective weights.

In an embodiment, step 1 comprises:

step 11: expanding the weight convolution kernel matrix to a K*K square matrix so that the square matrix can be equally divided into $P^2$ sub-matrixes, wherein P is an integer greater than or equal to 2;

step 12: equally dividing the square matrix into $P^2$ sub-matrixes;

step 13: further recursively and equally dividing sub-matrixes comprising effective weights in the P2 sub-matrixes until the sub-matrixes comprise only one weight, so as to obtain a multi-level sub-matrix; and step 14: for sub-matrixes comprising effective weights in the multi-level sub-matrix, marking an effective path branch as a bit value of 1 to obtain the index of effective weights.

In an embodiment, K takes the value of $m^n$, m is an integer greater than or equal to 2, and n is an integer greater than or equal to 1.

In an embodiment, in step 1, the index of effective weights is row and column coordinates of the effective weight in the weight convolution kernel matrix.

According to a second aspect of the present disclosure, a convolution computation method in a neural network is provided, comprising the following steps:

step 41: acquiring effective weights and an index of effective weights stored with the weight data storage method according to the present disclosure;

step 42: acquiring, according to the index of effective weights, convolution domain neurons matching the effective weights; and step 43: performing convolution operations of the effective weights and the convolution domain neurons.

According to a third aspect of the present disclosure, a neural network processor is provided, comprising:

a weight and index storage unit configured for storing effective weights and an index of effective weights obtained with the method of the present disclosure;

a neuron index unit configured for acquiring, according to the index of effective weights, convolution domain neurons matching the effective weights; and a computation array unit configured for performing convolution operations of the effective weights and the convolution domain neurons.

In an embodiment, the neural network processor of the present disclosure further comprises: a storage unit configured for storing the convolution domain neurons and convolution results; and a control unit configured for controlling an order of execution of the convolution operations of the effective weights and the convolution domain neurons.

Compared with the prior art, the present disclosure has the following advantages:

by establishing an index and performing compact storage for non-zero weights and directly locking neurons corresponding to the weights in a convolution domain for convolution operation using the index of weights, zero weights and neurons corresponding to the zero weights are discarded during convolution computation, which reduces storage space of neural network data processing and the number of neurons loaded, thus effectively reducing the operating power consumption of the neural network and improving the utilization of computing resources. In the present disclosure, weight data is stored separately from the index of weights, which is conducive to parallel search of target neurons.

BRIEF DESCRIPTION OF THE DRAWINGS

The accompanying drawings are merely schematic illustrations and explanations of the present disclosure and are not intended to limit the scope of the present disclosure, in which.

DETAILED DESCRIPTION

In order to make objectives, technical solutions, design methods, and advantages of the present disclosure more comprehensible, the present disclosure is provided in further details below with reference to the accompanying drawings and specific embodiments. It should be understood that the specific embodiments described herein are merely intended to explain the present disclosure rather than limit the present disclosure.

Figures 1A, 1B:
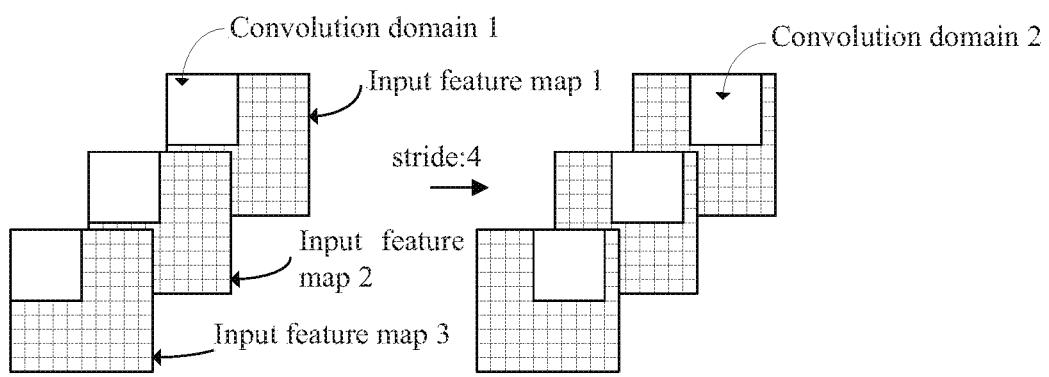
FIG. 1A and FIG. 1B are schematic diagrams illustrating a process of convolving input features.

Typically, a deep neural network is characterized by a topology with multiple layers of neural networks each including multiple feature layers. For example, for a convolutional neural network, a data processing process comprises multiple layers such as a convolution layer, a pooling layer, a normalization layer, a nonlinear layer, and a fully connected layer. An operation process of the convolution layer is as follows: input feature maps are scanned with a two-dimensional weight convolution kernel (e.g., an L*L kernel), and during the scanning, an inner product of the weight convolution kernel and neurons in a corresponding convolution domain in the feature map is calculated, and inner product values of all convolution domains are summed to obtain an output feature map or output neurons of the convolution layer. FIGS. 1A and 1B are schematic diagrams illustrating a process of scanning three input feature maps with a 5*5 weight convolution kernel. Then, the output feature map is further transferred to a next layer (e.g., a pooling layer) through a nonlinear activation function (such as ReLU). When each convolution layer has N output feature maps, N convolution kernels of an L*L size will convolve with the input feature maps in the convolution layer. The pooling layer is also referred to as a down-sampling layer, and its specific process may be as follows: a feature map (e.g., a feature map output to the pooling layer by the convolution layer) is scanned with a two-dimensional window (e.g., a pooling domain) of a P*P size, and during the scanning, a maximum value or an average value of corresponding neurons of the window in the layer is calculated to obtain output neurons of the pooling layer. On the one hand, the pooling layer can eliminate some noise information, which may be beneficial to feature extraction. On the other hand, it can also reduce the number of feature neurons in the next layer, thus reducing the size of the network.

In order to improve the efficiency of convolution computation in the neural network, a weight data storage method is provided in the present disclosure, which can be applied to a trained neural network model. In short, the weight data storage method of the present disclosure is to only establish an index for effective weights (i.e., non-zero weights) and perform compact storage on the weights based on the process of index establishment.

Figure 2:
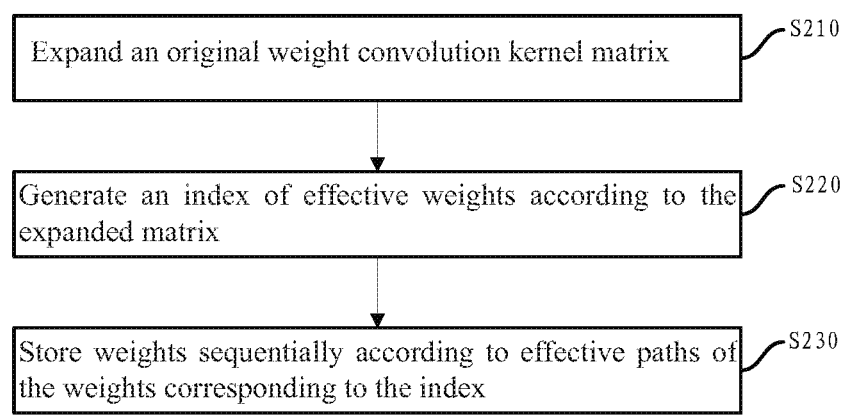
FIG. 2 is a flowchart illustrating a weight data storage method according to an embodiment of the present disclosure.

Specifically, FIG. 2 is a flowchart illustrating a weight data storage method according to an embodiment of the present disclosure, including the following steps.

In step 210, an original weight convolution kernel matrix is expanded.

In this step, the original weight convolution kernel matrix is expanded to a K*K square matrix so that the expanded matrix can be equally divided into $P^2$ sub-matrixes, wherein P is an integer greater than or equal to 2. In an embodiment, K may take the value of $m^n$, m is an integer greater than or equal to 2, and n is an integer greater than or equal to 1. Newly added elements in the square matrix are set to 0 with respect to the original weight convolution kernel matrix.

Figure 3A:
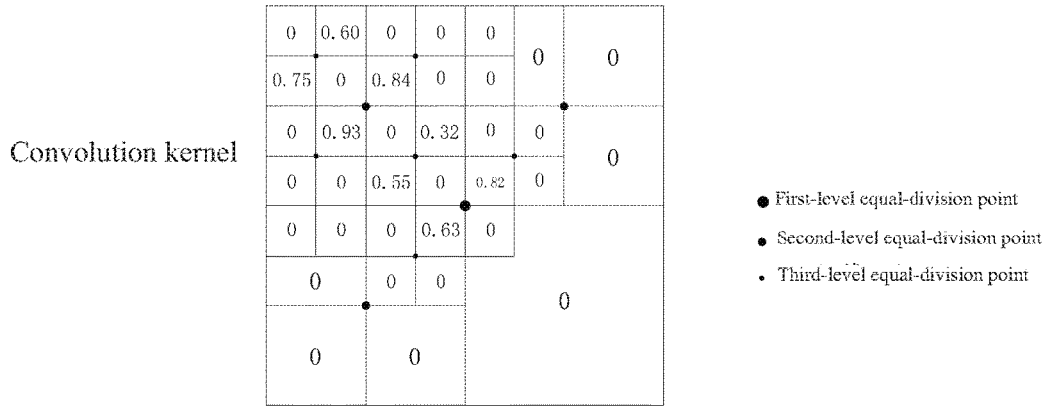
FIG. 3A, FIG. 3B and FIG. 3C are schematic diagrams illustrating a weight storage process according to an embodiment of the present disclosure.

For example, an original weight convolution kernel matrix is a 5*5 matrix $$A = \begin{bmatrix} 0 & 0.60 & 0 & 0 & 0 \\ 0.75 & 0 & 0.84 & 0 & 0 \\ 0 & 0.93 & 0 & 0.32 & 0 \\ 0 & 0 & 0.55 & 0 & 0.82 \\ 0 & 0 & 0 & 0.63 & 0 \end{bmatrix},$$

and is expanded to an 8*8 (i.e., K=8, m=2, n=3) matrix, wherein the newly added elements are set to 0, as shown in FIG. 3A.

It should be noted that for an original weight convolution kernel matrix, K has multiple values. For example, the original 5*5 matrix can also be expanded to K=9 (i.e., m=3, n=2). Preferably, in the case that the expanded matrix can be divided into $P^2$ equal parts, the K value closest to the size of the original weight convolution kernel matrix is selected, that is, for the above 5*5 matrix, K is preferably set to 8. In addition, in the case that the original convolution kernel matrix can be equally divided into $P^2$ equal parts, the following steps S220 and S230 are directly performed without expansion.

In step S220, an index is established for effective weights.

In this step, each weight convolution kernel is taken as a unit to establish an index of weights. Index establishment and weight storage processes will be illustrated below by taking a 5×5 weight convolution kernel shown in FIG. 3A as an example. Firstly, the center of the expanded matrix is selected and the expanded matrix is equally divided. In this embodiment, a quartering principle is adopted, that is, $P^2$=4. Referring to FIG. 3A, a first-level equal-division point is the center of the expanded 8*8 matrix, which equally divides the expanded matrix into four sub-matrixes of an equal size. For example, the four obtained 4*4 sub-matrixes are respectively:

$$A1 = \begin{bmatrix} 0 & 0.60 & 0 & 0 \\ 0.75 & 0 & 0.84 & 0 \\ 0 & 0.93 & 0 & 0.32 \\ 0 & 0 & 0.55 & 0 \end{bmatrix}$$

$$A2 = \begin{bmatrix} 0 & 0 & 0 & 0 \\ 0 & 0 & 0 & 0 \\ 0 & 0 & 0 & 0 \\ 0.82 & 0 & 0 & 0 \end{bmatrix},$$

$$A3 = \begin{bmatrix} 0 & 0 & 0 & 0 \\ 0 & 0 & 0 & 0 \\ 0 & 0 & 0 & 0 \\ 0 & 0 & 0 & 0.63 \end{bmatrix}$$

$$A4 = \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

Figure 3B:
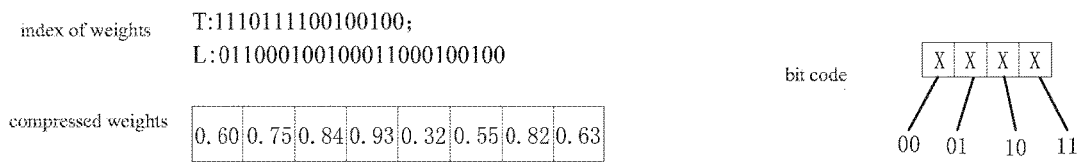
Figure 3B:
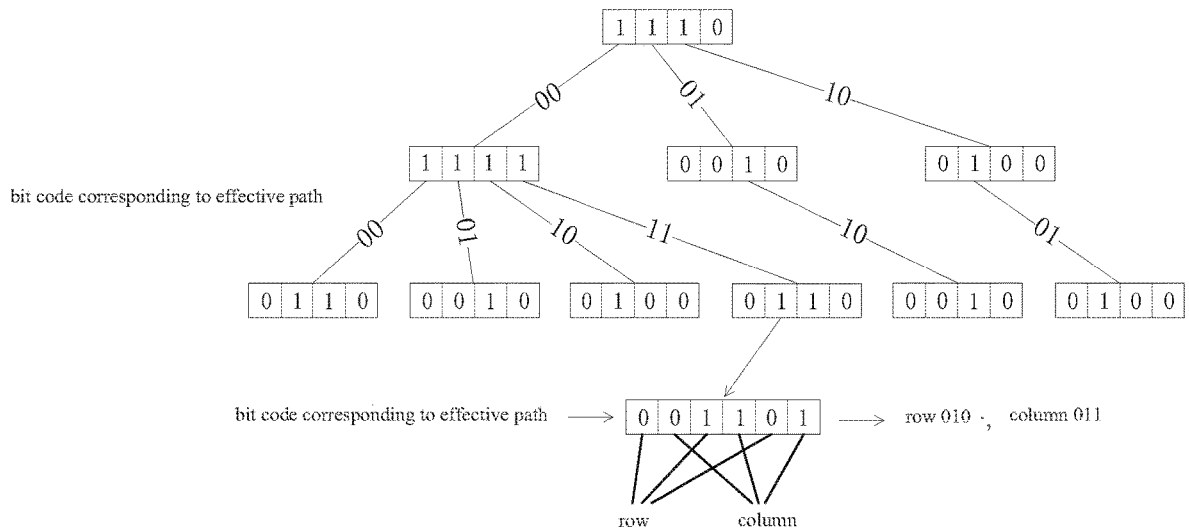

Next, each sub-matrix is analyzed to determine whether there is an effective weight in the sub-matrix. If there is an effective weight, a path branch is marked as 1; and if there is no effective weight, the path branch is marked as 0. For example, since the sub-matrixes A1, A2, and A3 all have effective weights, the path branch is marked as 1, and branches corresponding to A1, A2, and A3 are referred to as effective branches. The sub-matrix A4 has no effective weight, so the path branch is marked as 0. Therefore, bit values of the branches corresponding to the four sub-matrixes are sequentially 1110, and a first-layer node is denoted as 1110. That is, the first-layer node has three effective branches and one ineffective branch (not shown), as shown in FIG. 3B. In this embodiment, a single-node state tree of four sub-branches is established, and only effective branches are shown.

Then, the sub-matrix corresponding to the branch of 0 of the first-layer node is discarded, while a center point (i.e., a second-level equal-division point) is selected for each sub-matrixes with a branch of 1 according to the quartering principle, and bit values of sub-branches of the three effective branches of A1, A2, and A3 are marked as 1111, 0010, and 0100, respectively. The three sets of values constitute three nodes of the second layer, namely, the second-layer nodes have a total of six effective branches.

Similarly, the sub-matrixes corresponding to branches of 1 of the second-layer nodes are further recursively quartered (a center point of each sub-matrix is a third-level equal-division point), and sub-branch bit values of the six effective branches of the second-level nodes are 0110, 0010, 0100, 0110, 0010, and 0100, respectively. The six sets of values constitute six nodes of the third layer. Since the matrix represented by the branch of a third-layer node is a 1×1 matrix, that is, it includes only one weight, each node of the third layer is a leaf node.

It can be known from the above process that for the original weight convolution kernel matrix, an index of effective weights is T:1110111100100100 (2 bytes) for non-leaf nodes (including the first-layer and second-layer nodes); and L: 011000100100011000100100 (3 bytes) for leaf nodes (i.e., the third-layer nodes). Herein, the non-leaf nodes and the leaf nodes obtained through the above process are stored separately and collectively referred to as an index of effective weights. In this way, a space required to store the index of effective weights can be reduced. For example, in this embodiment, an index of 8 effective weights can be stored with only 5 bytes.

In the embodiment shown in FIG. 3B, since each node includes four sub-branches, the four branches can be encoded with two bits, sequentially as 00, 01, 10, and 11 from left to right, and the codes of the effective branches can be combined into codes of effective paths. For example, for the fifth effective weight 0.32 in the weight convolution kernel, a bit code of its effective path is 001101, which comprises an effective branch 00 of the first-layer node, an effective branch 11 of the first node in the second layer, and an effective branch 01 of the fourth leaf node. Row and column coordinates of a weight in the original convolution kernel can be parsed through a corresponding bit code of an effective path of the weight. For example, when the bit code is 001101, it indicates that its corresponding weight is in Row 010 (a binary representation corresponding to the $1^{st}$, $3^{rd}$, and $5^{th}$ bits of the bit code 001101), Column 011 (a binary representation corresponding to the $2^{nd}$, $4^{th}$, and $6^{th}$ bits of the bit code 001101), namely, in Row 2 and Column 3 (numbered from 0). Similarly, codes of all effective weights can be obtained, i.e., 000001, 000010, 000110, 001001, 001101, 001110, 011010, and 100101. Therefore, according to the stored effective weight index and an effective path coding rule known in advance, position coordinates of an effective weight in the original convolution kernel can be parsed.

It should be understood that since in the embodiment of FIG. 3B, four sub-matrixes (the four sub-matrixes can be regarded as a 2*2 permutation here) obtained by each equal division are encoded as 00, 01, 10, and 11, respectively, e.g., 00 represents a sub-matrix in Row 0 and Column 0, 01 represents a sub-matrix in Row 0 and Column 1, 10 represents a sub-matrix in Row 1 and Column 0, and 11 represents a sub-matrix in Row 1 and Column 1. For each two-bit value, its first bit (from left to right) corresponds to the row number, and the second bit corresponds to the column number. Therefore, the first bit of each two bits of the bit code constitutes a row-position representation (e.g., the $1^{st}$, $3^{rd}$, and $5^{th}$ bits of bit code 001101), and the second bit constitutes a column-position representation (e.g., the $2^{nd}$, $4^{th}$, and $6^{th}$ bits of bit code 001101).

It should be noted that FIG. 3B only schematically illustrates an encoding method, and those skilled in the art may also use other encoding methods, such as encoding four branches of each node from left to right as 11, 10, 01, and 00, or other encoding methods that can represent the branches. Corresponding row-position and column-position representations will also change accordingly for different encoding methods. In another embodiment, the original convolution kernel of 5*5 is expanded to 9*9. In this case, the expanded matrix can be equally divided into 9 equal parts (i.e., $P^2=9$), and the index of effective weights can be obtained by using a similar method as shown above.

In step S230, weights are stored based on effective paths of the weights corresponding to the index.

It can be known from steps S210 and S220 that a backtracking path of each non-zero leaf node represents an effective path of an effective weight. The effective weights are stored from left to right according to an effective path for establishing the index of weights. Therefore, for the 5×5 weight convolution kernel of this embodiment, the effective weights are stored in an order of 0.60-0.75-0.84-0.93-0.32-0.82-0.63.

It can be known from the above weight data storage method that the position or coordinate of each effective weight in the original weight convolution kernel can be parsed according to the storage order of the effective weight and the stored index of the weights.

In another embodiment, the weight data storage method comprises directly scanning an original weight convolution matrix, searching for effective weights and row coordinates and column coordinates corresponding to the effective weights, and storing the row coordinates and the column coordinates of the effective weights as an index of effective weights together with the effective weights. Compared with the embodiment in FIG. 2, this manner can simplify the process of expanding and equally dividing the original convolution kernel, but the space required to store the index of the weights will be relatively higher.

As described herein, by establishing an index of effective weights and storing weights in accordance with an effective path of establishing the index of weights, a large number of elements with a weight of 0 in a convolution kernel can be compressed, thus achieving an effect of weight compact storage and effectively reducing storage space.

Figure 3C:
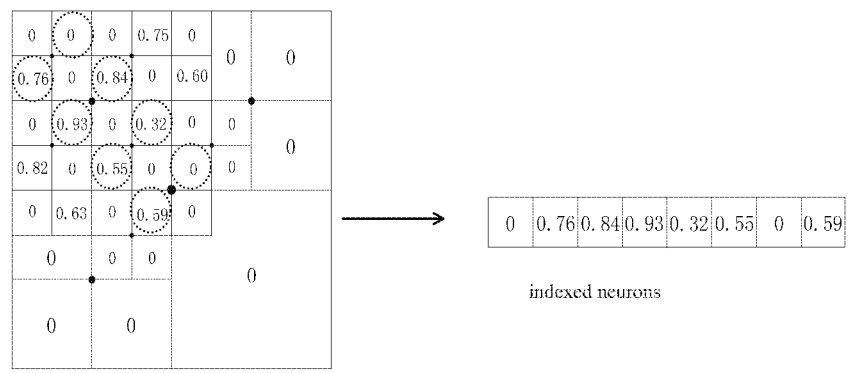

Further, in the process of convolution computation of the weight convolution kernel and neurons of convolution domains, the neurons of the convolution domains can be screened according to the index of effective weights to avoid loading neurons corresponding to ineffective weights. Specifically, row or column coordinates of the weights in the original convolution kernel can be obtained by path encoding corresponding to the index of effective weights, the coordinates are also coordinates of neurons matching effective weight convolutions in the convolution domains, and the position of a target neuron can be accurately locked in this way, as shown in FIG. 3C. By determining neurons corresponding to effective weights in a convolution domain of an input feature map through the index of weights, the neurons that have no impact on the convolution result can be discarded, thus improving the efficiency of convolution computation.

Figure 4:
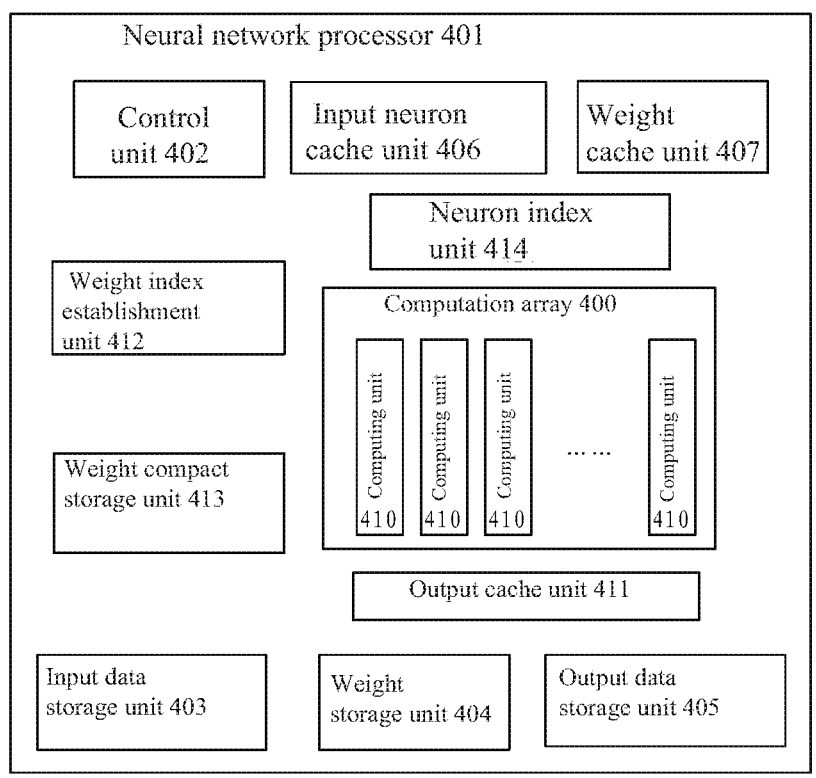
FIG. 4 is a schematic diagram illustrating a neural network processor according to an embodiment of the present disclosure.

The weight data storage method and the corresponding method for loading neurons in convolution domain based on an index of weights described in the present disclosure can be applied to neural network processors to improve the efficiency of convolution operation. FIG. 4 illustrates a neural network processor according to an embodiment of the present disclosure. The processor 401 includes a control unit 402, an input data storage unit 403, an output data storage unit 405, a weight storage unit 404, an input neuron cache unit 406, a weight cache unit 407, a computation array 400 (including at least one computing unit 410), an output cache unit 411, a weight index establishment unit 412, a weight compact storage unit 413, and a neuron index unit 414.

The input data storage unit 403 is coupled with the input neuron cache unit 406 and configured to store target data to be processed by various layers of a neural network. The data includes original feature map data and input data involved in computation of an intermediate layer.

The output data storage unit 405 is coupled with the output cache unit 411 and configured to store output neurons and intermediate results calculated by the computation array 400.

The weight storage unit 404 is coupled with the weight cache unit 407 and configured to store weights of a trained neural network as well as weights and indexes involved in the convolution operation.

The input neuron cache unit 406 is coupled with the computation array 400 and configured to provide neuron input values to the computation array 400.

The weight cache unit 407 is coupled with the computation array 400 and configured to provide compressed weights for different output feature maps to the computation array 400.

The weight index establishment unit 412 is coupled with the weight cache unit 407 and configured to establish an index for trained effective weights, output effective weights obtained during index establishment to the weight compact storage unit 413, and output the index of weights to the weight storage unit 404.

The weight compact storage unit 413 is coupled with the weight index establishment unit 412 and configured to receive effective weights extracted during index establishment and perform compact storage for the effective weights, and output a weight compression result to the weight storage unit 404.

The neuron index unit 414 is coupled with the weight cache unit 407 and configured to receive the index of weights in the weight cache unit 407, analyze an effective path of the effective weights, and convert the path to a relative address for transmission to the input neuron cache unit 406.

The computation array 400 is coupled with the output cache unit 411 and configured to perform convolution computation to obtain convolution computation results of the output feature maps.

The output cache unit 411 is coupled with the output data storage unit 405 and configured to obtain convolution computation results of the output feature maps or intermediate results.

The control unit 402 is coupled with the input data storage unit 403, the weight storage unit 404, the output data storage unit 405, the input neuron cache unit 406, the weight cache unit 407, the computation array 400, the weight index establishment unit 412, the weight compact storage unit 413, and the neuron index unit 414, respectively. The control unit 402 obtains parameters of each layer of the neural network and parameters of the computation array 400 in the processor, performs convolution computation on the neurons and the weights, and controls loading of data of each storage unit and the order of caching the data, so as to ensure accuracy of the convolution operation results.

In addition to the weight index establishment unit 412, the weight compact storage unit 413, and the neuron index unit 414 that are associated with implementing the weight data storage method and the corresponding method for loading convolution domain neurons based on an index of weights, the neural network processor shown in FIG. 4 further includes an output cache unit 411, an output data storage unit 405, an input data storage unit 403, and/or other types of storage units or cache units. These storage units help to ensure smoothness of data loading, data processing, and output of computation results of the neural network processor, thus improving data throughput of the neural network processor.

Figure 5:
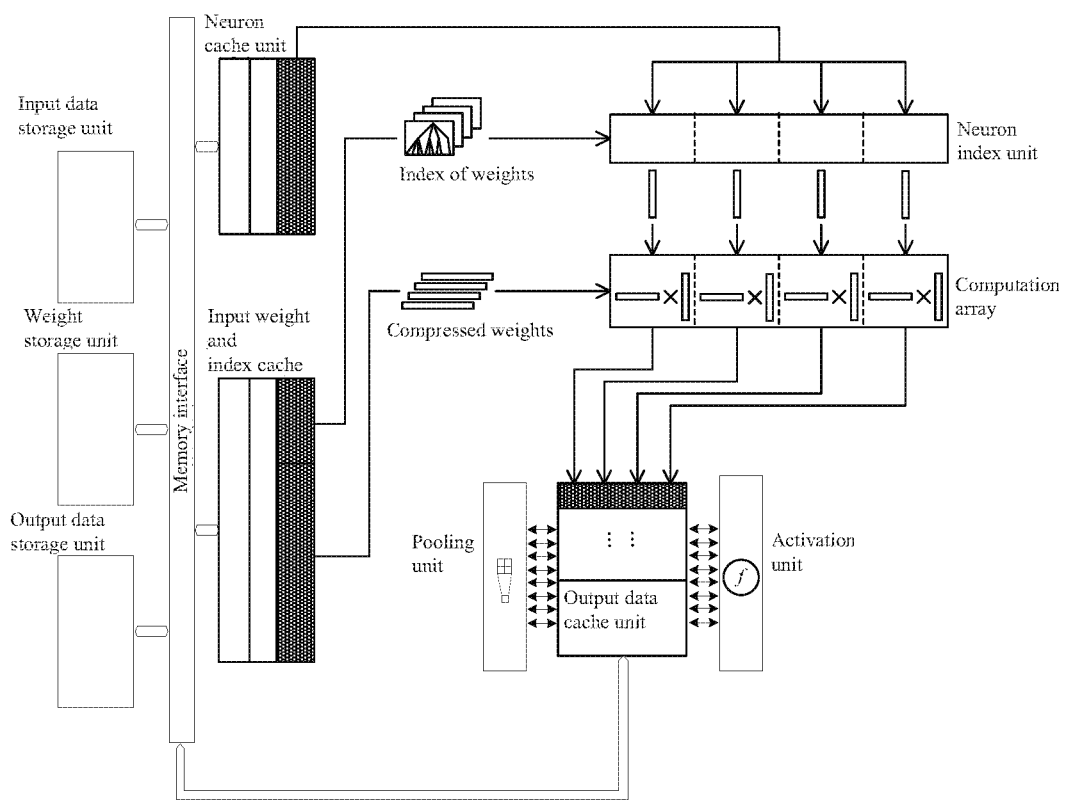
FIG. 5 is a schematic diagram illustrating connections among units of the neural network processor in FIG. 4.
Figure 6:
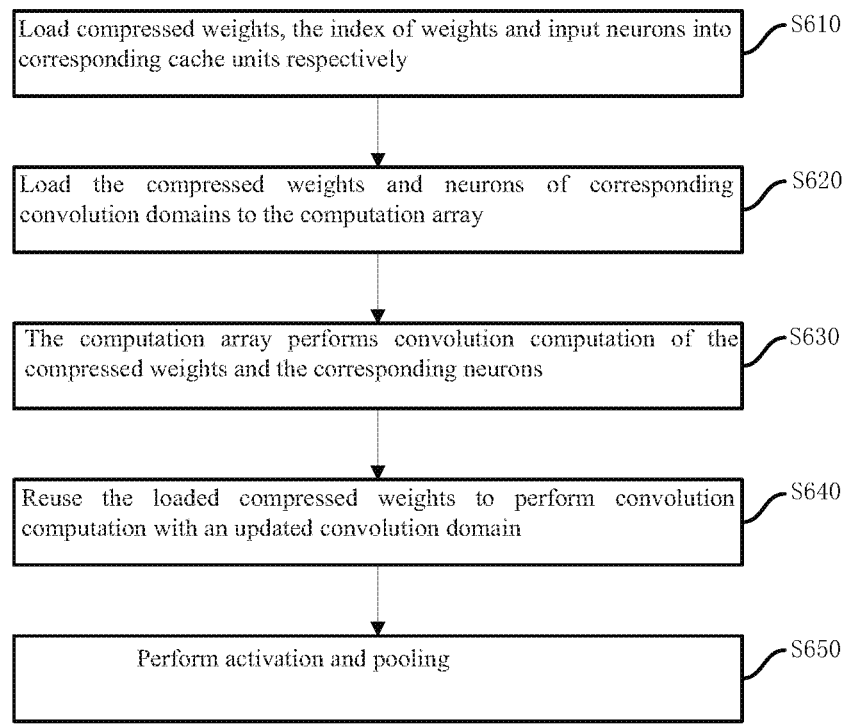
FIG. 6 is a flowchart illustrating operations of the neural network processor in FIG. 5.

FIG. 4 illustrates the neural network processor in a modular manner to enable a better understanding of the relationships among various units and the process of data processing, FIG. 5 further elaborates on the neural network processor of FIG. 4, in which an input weight and index cache unit corresponds to the weight cache unit in FIG. 4, and an activation unit and a pooling unit are also illustrated, which are configured for activation and pooling in each neural network layer, respectively. Based on the illustration of FIG. 5, the operating process of the neural network processor is described by taking one input feature map and four output feature maps as an example and by taking one weight convolution kernel as the unit. The process, as shown in FIG. 6, specifically includes the following steps.

In step S610, compressed weights, input neurons, and the index of weights are loaded into respective cache units.

The compressed weights and the index of weights obtained based on the weight data storage method of the present disclosure are loaded into the input weight and index cache unit, and the input neurons are loaded into the neuron cache unit. If the cache is full, the loading of the data is suspended.

In step S620, the compressed weights and neurons of corresponding convolution domains are loaded into the computation array.

Specifically, step S620 includes directly loading the compressed weights into the computation array in a stored original permutation order and locking neurons corresponding to the compressed weights in the cached neuron convolution domain by using the index of weights.

For example, for the four output feature maps (i.e., there are four sets of convolution kernels, and neurons in each convolution domain are convolved with all the convolution kernels), neurons of a convolution domain are replicated in four copies and deployed in the neuron index unit, and the neuron index unit includes, according to the index of weights corresponding to different output feature maps, the neurons that correspond to the index of effective weights, and discards the other neurons.

In step S630, the computation array performs convolution operation on the compressed weights and the corresponding neurons.

Specifically, the compressed weights and the corresponding neurons constitute two effective vectors, the computation array performs convolution operation for the two vectors, and intermediate results or convolution results are loaded into the output cache unit. When the cache is full, writing is suspended and data in the cache unit is output to the output data storage unit.

Through steps S610, S620 and S630, the convolution operation of the convolution kernel with neurons in a convolution domain can be completed.

In step S640, the loaded compressed weights are reused to perform convolution computation with an updated convolution domain.

After the convolution operation of a convolution domain is completed, the loaded weights are reserved in the computation array. The updated convolution domain is shifted by a stride, and neurons of a new convolution domain are loaded. Effective neurons of the new convolution domain are locked according to the index of weights and loaded into the computation array. This process is repeated until the convolution computation of all neurons in an input feature map is completed.

In another embodiment, in the case of multiple input feature maps, the convolution operation of different convolution domains of one input feature map is completed first, and then the other feature maps are processed in turn. In this way, the loaded compressed weights can be reused.

In step S650, activation and pooling are performed.

Obtained convolution results are activated and pooled. This process belongs to the prior art and will not be described in detail here.

As described herein, compact storage of effective weights saves storage space, and further loading of corresponding neurons based on an index of the effective weights improves the efficiency of convolution computation, especially for sparse neural networks with a large number of weights of 0.

The neural network processor of the present disclosure can be applied to various electronic devices, such as mobile phones and embedded electronic devices.

It should be noted that weights are compressively stored according to the present disclosure, and therefore the weights stored based on the method of the present disclosure are also referred to as compressed weights. In addition, the convolution kernel, the weight convolution kernel, and the weight convolution kernel matrix involved herein have the same meaning. They all refer to a matrix formed by weight values, which is used for convolution with neurons in a convolution domain.

It should be noted that although various steps are described in a particular order above, the steps are not meant to be executed in that particular order. In fact, some of these steps can be executed concurrently, or even in a different order, as long as the desired functions are achieved.

The present disclosure may be applied in a system, a method, and/or a computer program product. The computer program product may include a computer-readable storage medium (e.g., a non-transitory computer-readable storage medium) storing computer-readable program instructions for causing a processor to implement various aspects of the present disclosure.

The computer-readable storage medium may be a physical device capable of retaining and storing instructions used by an instruction-executing device. The computer-readable storage medium can be, for example, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punched card or protrusions in a groove on which instructions are stored, and any appropriate combination of the above.

Various embodiments of the present disclosure have been described above, and the foregoing description is illustrative rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments, or technical improvements of the technologies on the market, or to enable other persons of ordinary skill in the art to understand the embodiments disclosed here.

The invention claimed is:

1. A method implemented in a neural network, the method comprising:
    searching for effective weights in a weight convolution
        kernel matrix and acquiring an index associated with the effective weights, wherein the effective weights are non-zero weights and the index associated with the effective weights is used to mark respective positions of the effective weights in the weight convolution kernel matrix; wherein searching for the effective weights in the weight convolution kernel matrix and acquiring the index associated with the effective weights comprise:
expanding the weight convolution kernel matrix to a K by K square matrix;
equally dividing the square matrix into $P^2$ sub-matrixes, wherein P is an integer greater than or equal to 2;
recursively and equally dividing one or more sub-matrixes of the $P^2$ sub-matrixes that comprise an effective weight until leaf sub-matrixes resulting from the dividing comprise only one weight, wherein a multi-level sub-matrix is obtained from the dividing; and
for each of the leaf sub-matrixes that is associated with an effective weight, marking an effective path branch associated with the leaf sub-matrix with a bit value of 1 to obtain the index associated with effective weights; and
storing the effective weights and the index associated with the effective weights.

2. The method of claim 1, wherein K has a value of $m^n$, m is an integer greater than or equal to 2, and n is an integer greater than or equal to 1.

3. The method of claim 1, wherein the index associated with the effective weights indicates row and column coordinates of the effective weights in the weight convolution kernel matrix.

4. The method of claim 1, further comprising:
acquiring, based on the index associated with the effective weights, one or more convolution domain neurons matching the effective weights; and
performing convolution operations associated with the effective weights and the convolution domain neurons.

5. A neural network processor, comprising:
a weight and index storage unit configured to store effective weights and an index associated with the effective weights, wherein the effective weights are non-zero weights associated with a weight convolution kernel matrix and wherein the index associated with the effective weights is used to mark respective positions of the effective weights in the weight convolution kernel matrix;
a neuron index unit configured to acquire, based on the index associated with the effective weights, convolution domain neurons corresponding to the effective weights; and
a computation array unit configured to perform convolution operations associated with the effective weights and the convolution domain neurons, wherein the index associated with the effective weights is acquired by:
expanding the weight convolution kernel matrix to a K by K square matrix;
equally dividing the square matrix into $P^2$ sub-matrixes, wherein P is an integer greater than or equal to 2;
recursively and equally dividing one or more sub-matrixes of the $P^2$ sub-matrixes that comprise an effective weight until leaf sub-matrixes resulting from the dividing comprise only one weight, wherein a multi-level sub-matrix is obtained from the dividing; and
for each of the leaf sub-matrixes that is associated with an effective weight, marking an effective path branch associated with the leaf sub-matrix with a bit value of 1.

6. The neural network processor of claim 5, further comprising:
a storage unit configured to store the convolution domain neurons and a convolution result; and
a control unit configured to control an order in which the convolution operations associated with the effective weights and the convolution domain neurons are executed.

7. The neural network processor of claim 5, wherein K has a value of $m^n$, m is an integer greater than or equal to 2, and n is an integer greater than or equal to 1.

8. The neural network processor of claim 5, wherein the index associated with the effective weights indicates row and column coordinates of the effective weights in the weight convolution kernel matrix.

9. A non-transitory computer-readable storage medium storing instructions that, when executed by a processor, cause the processor to at least:
search for effective weights in a weight convolution kernel matrix and acquire an index associated with the effective weights, wherein the effective weights are non-zero weights and the index associated with the effective weights is used to mark respective positions of the effective weights in the weight convolution kernel matrix;
expand the weight convolution kernel matrix to a K by K square matrix;
equally divide the square matrix into P2 sub-matrixes, wherein P is an integer greater than or equal to 2;
recursively and equally divide one or more sub-matrixes of the P2 sub-matrixes that comprise an effective weight until leaf sub-matrixes resulting from the dividing comprise only one weight, wherein a multi-level sub-matrix is obtained from the dividing;
for each of the leaf sub-matrixes that is associated with an effective weight, mark an effective path branch associated with the leaf sub-matrix with a bit value of 1 to obtain the index associated with effective weights; and
store the effective weights and the index associated with the effective weights.

10. The non-transitory computer-readable storage medium of claim 9, wherein K has a value of $m^n$, m is an integer greater than or equal to 2, and n is an integer greater than or equal to 1.

11. The non-transitory computer-readable storage medium of claim 9, wherein the index associated with the effective weights indicates row and column coordinates of the effective weights in the weight convolution kernel matrix.

12. The non-transitory computer-readable storage medium of claim 9, wherein the instructions, when executed by the processor, further cause the processor to:
acquire, based on the index associated with the effective weights, one or more convolution domain neurons matching the effective weights; and
perform convolution operations associated with the effective weights and the convolution domain neurons.

* * * * *